US005748895A

United States Patent [19]
Shiff et al.

[11] Patent Number: 5,748,895
[45] Date of Patent: May 5, 1998

[54] SYSTEM FOR REMOTELY PROGRAMMING A PORTABLE INFORMATION DEVICE USING VISIBLE OPTICAL PATTERN TRANSMITTED FROM A DISPLAY DEVICE WHILE CONCURRENTLY DISPLAYING HUMAN-READABLE EXPLANATION OF THE PATTERN

[75] Inventors: Victor Shiff, Wolcott, Conn.; Neil S. Fishman, Bothell, Wash.; Philip Brzezinski, Middlebury, Conn.

[73] Assignee: Microsoft Corporation, Redmond, Wash.

[21] Appl. No.: 786,192

[22] Filed: Jan. 17, 1997

Related U.S. Application Data

[63] Continuation of Ser. No. 428,917, Apr. 25, 1995, abandoned.

[51] Int. Cl.⁶ ........................................................ G06F 3/14
[52] U.S. Cl. .................. 395/200.09; 395/840; 395/892; 395/894; 364/237.3; 364/237.6; 364/919.5; 364/926.7; 359/109; 359/159
[58] Field of Search ........................ 395/200.09, 840, 395/892, 894; 364/237.3, 237.6, 231.2, 259.4, 919.5, 920, 926.7; 359/109, 159

[56] References Cited

U.S. PATENT DOCUMENTS

| 4,496,158 | 1/1985 | Baer ........................................ 273/312 |
| 4,534,012 | 8/1985 | Yokozawa ................................ 364/900 |
| 4,910,775 | 3/1990 | Yves et al. ................................ 380/25 |
| 4,999,617 | 3/1991 | Uemura et al. ........................... 340/706 |
| 5,136,644 | 8/1992 | Audebert et al. ......................... 380/25 |
| 5,150,113 | 9/1992 | Bluthgen ............................... 340/825.3 |
| 5,231,488 | 7/1993 | Mohrbacher et al. ................... 358/139 |
| 5,410,326 | 4/1995 | Goldstein ................................ 348/134 |
| 5,434,626 | 7/1995 | Hayashi et al. .......................... 348/569 |
| 5,449,904 | 9/1995 | Miller et al. ............................. 250/216 |
| 5,488,571 | 1/1996 | Jacobs et al. ........................ 364/705.07 |
| 5,506,628 | 4/1996 | Chun ...................................... 348/565 |

*Primary Examiner*—Thomas C. Lee
*Assistant Examiner*—Ki S. Kim
*Attorney, Agent, or Firm*—Lee & Hayes, PLLC

[57] ABSTRACT

A system and method is provided for remotely and optically programming a portable information device, such as a programmable watch, using a visual display device, such as a CRT monitor. The monitor displays a sequence of changing optical patterns used to optically transmit a serial stream of data. The optically programmable watch has an optical sensor which detects the sequence of optical patterns to optically receive the data stream. The optical patterns transmit machine-readable information that can be detected by the optical sensor, but no meaningful information to a user. The visual display device therefore also displays a human-readable image that explains to a user the sequence of optical patterns being used to transmit the data stream. The human-readable image is displayed in a manner that renders it undetectable by the optical sensor of the programmable watch.

12 Claims, 4 Drawing Sheets

SYSTEM FOR REMOTELY PROGRAMMING A PORTABLE INFORMATION DEVICE USING VISIBLE OPTICAL PATTERN TRANSMITTED FROM A DISPLAY DEVICE WHILE CONCURRENTLY DISPLAYING HUMAN-READABLE EXPLANATION OF THE PATTERN

RELATED APPLICATIONS

This is a continuation of U.S. patent application Ser. No. 08/428,917, filed Apr. 25, 1995, now abandoned.

TECHNICAL FIELD

This invention relate methods for remotely programming portable information devices using optical serial data transmission from frame-scanning graphics display devices. More particularly, this invention relates to systems and methods for optically transmitting serial data to programmable watches.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to hand-held calculators. They have a fall input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows® which maintains daily appointment schedules, to-do lists, personal notes, and calendar planning. This information is often a duplicate of that maintained on the portable personal organizer.

Timex Corporation of Middlebury, Conn., has recently introduced the Timex® Data-Link™ watch. This watch utilizes new technology for transferring information from a personal computer to a watch. This system is more fully disclosed and described in U.S. Pat. No. 5,488,571, which issued Jan. 30, 1996, in the names of Jacobs and Insero, and is assigned to Timex Corporation. The watch has an optical sensor which is connected to a digital serial receiver, and preferably to a UART (universal asynchronous receiver/transmitter) although other serial receiver configurations can be employed. The function of the UART is preferably incorporated into an integrated circuit which also operates the time keeping functions of the watch. The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is used to provide light pulses to the watch. Although it appears to a human viewer that all pixels of a CRT are illuminated simultaneously, the pixels are actually illuminated individually, one at a time, by an electron beam which sequentially scans each row of pixels beginning with the top row and ending with the bottom row. It is this characteristic of a CRT and of other scanned display devices which is utilized to transmit serial data to the Data-Link™ watch. To transfer data to the watch, the watch is held near and facing the CRT. The computer is programmed to display a sequence of display frames in which spaced horizontal pixel lines represent individual bits of data to be transferred. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. As used herein, the term "display frame" means a single screen-size image made up of a matrix of pixels. A display frame is generally created by sequentially illuminating or refreshing the pixels of the display device.

While this data transfer technique is very effective, it does require absolute control of a computer's display device during watch programming, and precludes any use of the display device for communicating with a user. The result, in fact, can be somewhat baffling to a user who sees only a rapidly-changing series of horizontal lines while the watch is being programmed.

It would be desirable to provide the user with some type of feedback during programming of the watch. Current technology, however, does not allow use of the computer's display device for this purpose while downloading watch data.

SUMMARY OF THE INVENTION

This invention relates to a system and method for remotely programming a portable information device, and particularly a programmable watch, using optical patterns displayed on a computer monitor to serially convey data. The watch has an optical sensor that detects the optical patterns. The same information contained in the computer can therefore be conveniently and efficiently transmitted to the watch. After being programmed with the scheduling data, the watch is ready for use as a personal organizer to assist the user in remembering key appointments, phone numbers, important anniversaries, and other data.

According to one aspect of the invention, a system includes the optically programmable watch and a visual display device, such as a CRT or other scanned-pixel monitor. A sequence of display frames having changing optical patterns is displayed on the monitor. Each optical pattern is preferably in the form of a set of serially and contiguously scanned lines that extend across the monitor and are scanned for a finite duration. The optical patterns transmit a serial stream of machine-readable data bits that can be detected by the optical sensor and used to program the watch. However, this machine-readable patterns convey no intelligible information to a user. Accordingly, the monitor also displays a human-readable image that explains to a user the optical patterns being used to program the watch. The human-readable image is displayed in such a manner that it goes undetected by the optical sensor of the programmable watch.

According to one technique, the textual image is displayed in a color that cannot be detected by the watch's optical sensor. In a second technique, the textual information is scanned on the monitor screen in non-contiguous discrete bursts of short duration, such as in the form of raster-scanned alphanumeric characters, that are perceived as noise and rejected by the optical sensor.

DETAILED DESCRIPTION OF THE PREFERRED EMBODIMENT

Figure 1:
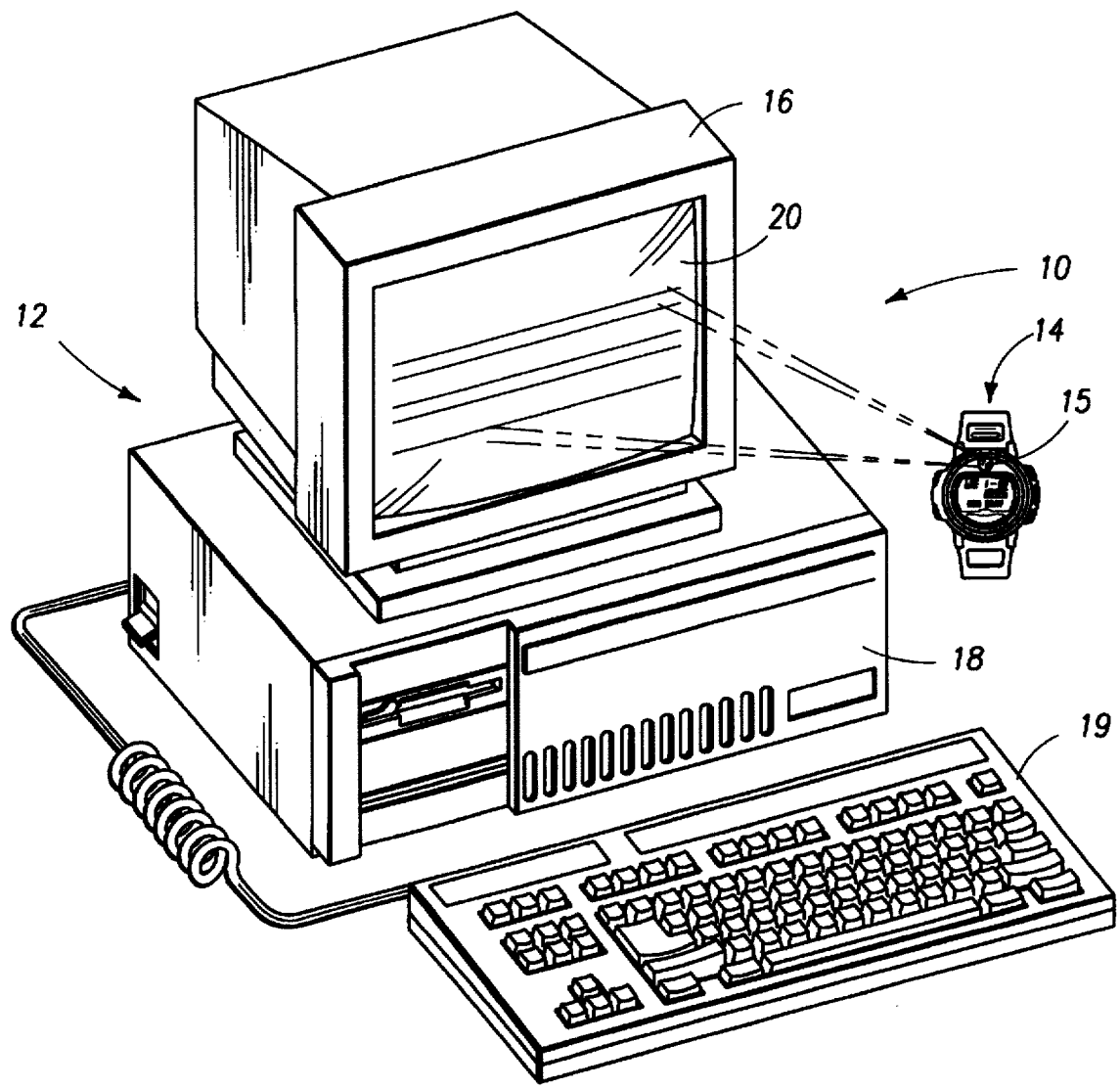
FIG. 1 is a diagrammatic illustration of a system for remotely programming an optical programmable watch according to one embodiment of this invention.

FIG. 1 shows a personal electronic time management system 10 according to one embodiment of this invention. Time management system 10 includes a computer system 12 and an optically programmable watch 14 constructed with an optical sensor 15. The computer system 12 remotely programs watch 14 by optically transmitting a serial stream of data that can be detected and deciphered by watch 14. The preferred embodiment of this invention involves a programmable watch, such as the commercially available Timex® Data-Link™ watch, which can be configured to function as a portable personal time manager. Accordingly, the invention will be described herein within the context of a programmable watch. The first Data-Link™ watch had a rewritable memory capacity of approximately 1K byte. However, other forms of portable information devices can be used, such as pagers and personal digital assistants (PDAs). As used herein, "portable information device" means any small, portable, electronic apparatus.

Computer system 12 includes a visual display device 16, a central processing unit (CPU) 18, and a keyboard 19 (or other input device). The illustrated computer system is an IBM®-compatible system, although other architectures, such as Apple®-compatible systems, can be used. Visual display device 16 is a frame-scanning graphics display device, such as a CRT (Cathode Ray Tube) monitor that is commonly used in personal computers. The graphics display device shows a sequence of display frames containing graphical images on monitor screen 20. A "display frame" or "frame" means a single screen-size image made up of a matrix of pixels. The frames are displayed successively at an effective rate that they appear visually constant on the monitor screen 20, rather than flickering. One type of conventional CRT monitor operates at 60 Hz, meaning that the monitor screen 20 is refreshed once every ¹⁄₆₀ or 0.01667 second. In contrast, the human eye only begins to perceive a non-constant flickering at a much slower frequency of about 10 Hz.

As discussed above, the pixels of a CRT are illuminated individually by an electron beam (i.e., the cathode ray) which sequentially scans each row of pixels beginning with the top row and ending with the bottom row. The beam is deflected horizontally (in the line direction) and vertically (in the field direction) to scan an area of the screen to produce a single display frame. The electron beam strikes phosphors positioned at the screen of the CRT monitor to cause them to glow. The phosphors continue to glow for a short time interval that is sufficient to provide a light pulse. The phosphors are arranged according to a desired pixel pattern, which is customarily a matrix of rows and columns. Conventional color VGA monitors typically have a resolution of 640×480 pixels or better.

The linear scanning electron beam is utilized to transmit serial data to programmable watch 14. Software loaded in CPU 18 generates a sequence of frames having changing optical patterns that is displayed on the CRT monitor 16. The optical patterns transmit machine-readable information that can be detected by optical sensor 15 and used to program the programmable watch 14. Preferably, the optical patterns consist of sets of parallel, horizontal, contiguously-scanned lines that traverse across screen 20. Each display frame depicted on the screen includes one or more lines which represent respective groups of data bits that comprise programming information used to program the watch 14.

Figure 2:
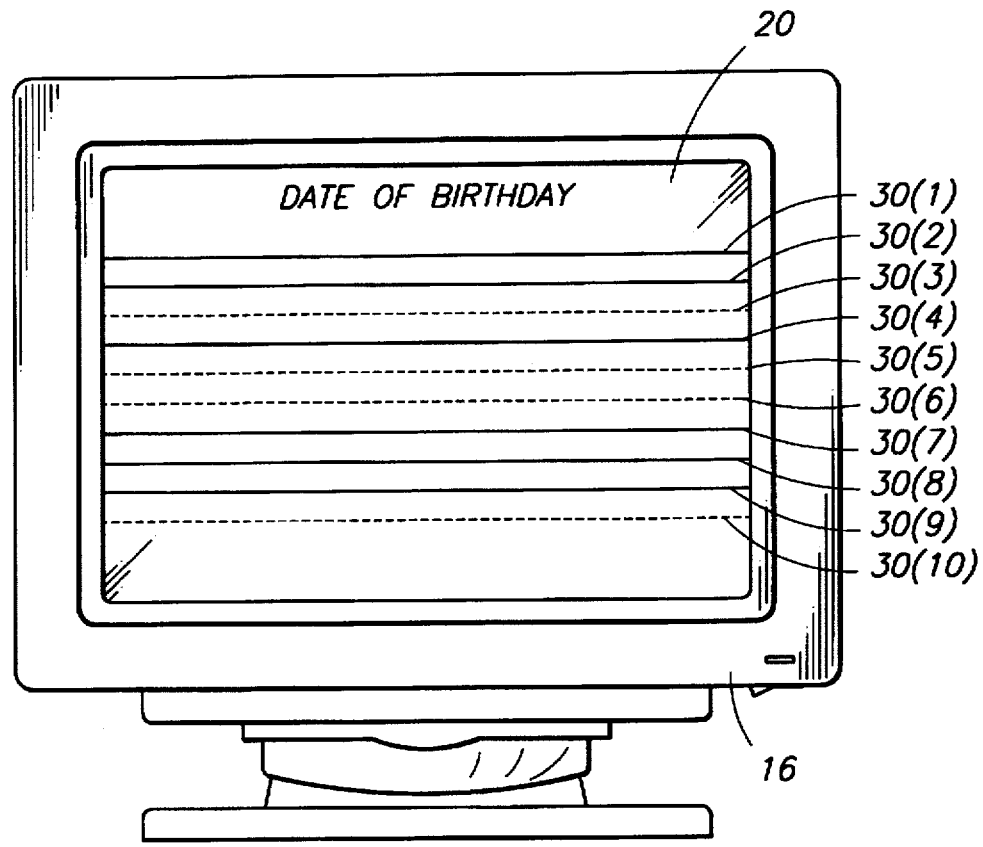
FIG. 2 is a diagrammatic front view of a CRT monitor depicting a display frame having contiguously-scanned lines used to convey bits of information to the programmable watch and undetectable human-readable text used to explain the data transmission to a user.

FIG. 2 shows a preferred optical pattern in more detail. Each frame contains at least one set of ten contiguously-scanned lines 30(1)–30(10), although multiple sets of ten lines can be simultaneously displayed. The dashed horizontal lines are shown only for illustration purposes to represent the absence of lines. Each line position conveys one data bit of information. Bits having a first binary value, such as a value '0', are represented by illuminated lines (e.g., lines 30(1), 30(2), 30(4), and 30(7)–30(9)) and bits having a second binary value, such as a value '1', are represented by non-illuminated lines (as illustrated pictorially by the dashed lines 30(3), 30(5), 30(6), and 30(10)). The lines are spaced at a selected distance to produce a desired temporal spacing appropriate for the data receiving electronics of watch 14. Additionally, when scanning all or part of a horizontal line, the electron beam of the CRT monitor is pulsed for a sufficient duration of time such that it can be detected by the optical sensor and associated electronics.

For each programming instruction or data to be transmitted to the watch, the software resident in the CPU 18 causes the CRT monitor 16 to selectively illuminate the appropriate horizontal lines representing '0' bits by scanning the associated rows of pixels. The horizontal lines that represent '1' bits are left non-illuminated. The middle eight lines 30(2) –30(9) represent one byte of programming information being optically transmitted to watch 14. Top line 30(1) represents a start bit and bottom line 30(10) represents a stop bit that are used to set apart each byte of data.

The optical sensor 15 in programmable watch 14 detects the changing optical patterns displayed on monitor 16. Watch 14 includes firmware and hardware coupled to optical sensor 15 which decodes the optical patterns to extract the bits of programming information. By way of example, the Timex® Data-Link™ watch has a digital serial receiver, better known as a UART (Universal Asynchronous Receiver/Transmitter), coupled to the optical sensor 15. The Timex® watch also includes a central processing unit (CPU), a read only memory (ROM) for storing initial power-up programs and other identification information, a random access memory (RAM) for data storage, and an internal bus for interfacing these components. These components, excluding the UART, can be incorporated into a single microprocessor-based integrated circuit. One appropriate microprocessor IC is available from Motorola Corporation as model MC68HC05HG.

Figure 3:
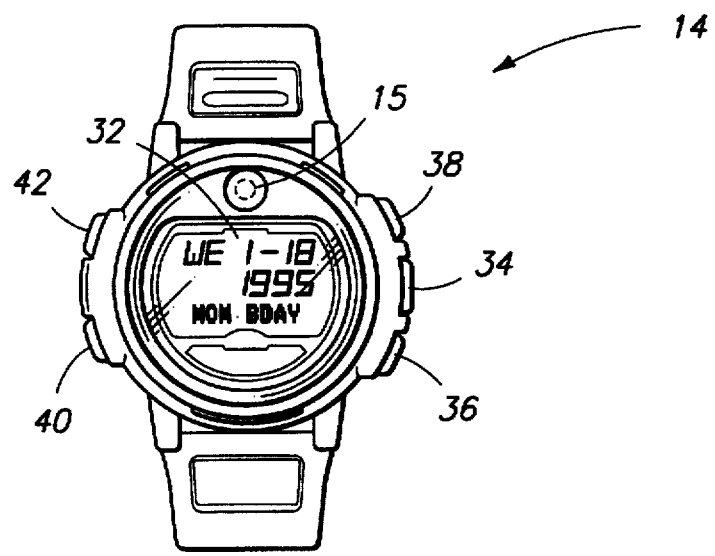
FIG. 3 is a diagrammatic front view of the programmable watch having an optical sensor according to a first construction of this invention.

FIG. 3 shows an external face of the programmable watch 14, which is illustrated for discussion proposes as the Timex® Data-Link™ watch. It is noted that other watch constructions as well as other portable information devices can be used in the context of this invention. Watch 14 includes a small display 32 (such as an LCD), a mode select button 34, a set/delete button 36, next/previous programming buttons 38 and 40, and a display light button 42. In the programming mode, display 32 indicates the programming option, and what data is being entered therein. During the normal operational mode, display 32 shows time of day, day of week, or any other function common to watches.

Optical sensor 15 is positioned adjacent to display 32. Optical sensor is preferably a commercially available phototransistor. One example phototransistor is manufactured by Sharp Electronics Corporation and sold under the part number PT370.

Figure 4:
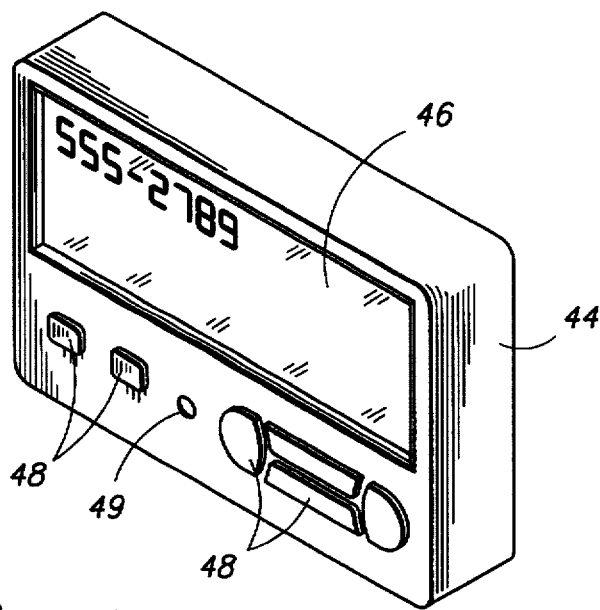
FIG. 4 is a diagrammatic front view of a programmable portable information device according to another construction of this invention.

FIG. 4 shows an alternative embodiment of a portable information device 44 of this invention in the form of a pager or personal digital assistant (PDA). Device 44 has an LCD 46, keypad 48 for entering data, and an optical sensor 49. Like watch 14, device 44 can be optically programmed from a visual display device, such as a scanned-pixel monitor.

To program the watch, the computer is first loaded with a compatible time management software and optical pattern generating software. One example time management software is Microsoft's® Schedule+™ for Windows® and a suitable optical pattern generating software is Timex® Data-Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34–40 and holds optical sensor 15 in juxtaposition with monitor screen 20. A sequence of changing optical patterns having horizontal contiguously-scanned lines begin to flash across the monitor screen as shown in FIGS. 1 and 2 to optically transmit data regarding the various appointments and tasks. In about 20 seconds, the system will have transmitted as many as 70 entries, including the birthday reminder.

Although the spaced horizontal lines appearing on the CRT monitor screen convey useful machine-readable information to the optical sensor, they convey no meaningful information to the user. The user cannot discern what is being transmitted, when transmission will be completed, whether there has been an error in the transmission, or any other tangible information.

Accordingly, this invention generally concerns an improved user interface that helps the user understand the programming process. During transmission of the programming data, the CRT monitor displays human-readable images explaining the optical pattern. The human-readable images are preferably in the form of alphanumeric characters that are displayed simultaneously with the optical pattern. This textual description informs the user as to what activities are taking place during the programming. As shown in FIG. 2, for example, the textual image "DATE OF BIRTHDAY" is simultaneously displayed on screen 20 with the contiguously-scanned parallel lines used to transmit the data concerning the user's mother's birthday to the watch.

The textual birthday message shown in FIG. 2 is provided for example purposes. Practically any message can be displayed. Messages concerning appointments, phone numbers, alarms, to-do lists, anniversaries, and transmission errors can likewise be displayed. Additionally, the human-readable image can be displayed in a non-textual form, such as graphical images, that likewise convey meaningful information to the user. For instance, the human-readable image might consist of icons or symbols which convey an explanation of the data transfer and related operations.

According to this invention, the image depicted on screen 20 cannot be detected by the optical sensor 15 of programmable watch 14. There are two primary ways that the image is rendered undetectable. In the first technique, the message is displayed in a color that cannot be detected by the optical sensor. Phototransistors, such as sensor 15, are typically manufactured to detect colors at or near the red end of the color spectrum. The contiguously-scanned lines 30(1)–30 (10) in FIG. 2 are therefore drawn in first colors such as red or orange so that the electronic sensor 15 can detect the optical pattern.

The textual image, however, is displayed in a different second color that is far from the red end of the color spectrum, such as light blue. Some sensors are constructed, or can be modified, so that they cannot detect the second color. Accordingly, a light blue textual image "DATE OF BIRTHDAY" goes undetected by the watch, but conveys the helpful explanation to the user.

A second technique for rendering the image undetectable is to display the message in a manner which the optical sensor perceives and rejects as noise. It has been discovered that a textual image displayed in discrete characters formed by short scanning bursts of the cathode ray beam, as is common in raster scanned characters on a monitor, is perceived as noise by the optical sensor of the Data Link™ watch and its associated receiving electronics. The discrete raster scanned characters of comparatively short scan duration provide a stark contrast to the contiguously-scanned lines of comparatively long scan duration that traverse entirely across the monitor screen. The optical sensor therefore filters these narrow pulses, and rejects them as noise.

Consider the following example. For a conventional 60 Hz VGA color monitor having a resolution of 640×480 pixels, the screen is refreshed once every 1/60 or 0.0167 second. Approximately ten percent of the refresh time is used to move the electron beam from the bottom line back following completion of one frame to the top line for the start of the next frame. This means that the time it takes to scan one entire screen is approximately 0.015 second. At 480 rows of pixels, the electron beam uses 0.00003125 second (i.e., 0.015 second/480 rows) to scan one row of pixels. During display of a contiguously-scanned line 30(1) –30(10), the electron beam is on the entire 0.00003125 second, striking every pixel in the row. The optical sensor can detect this continuous beam path of comparatively long duration. To display discrete characters on the screen, however, considerably fewer pixels are illuminated by the electron beam within a scan line in comparison to illuminating an entire contiguous line. To scan a single pixel, for example, the beam is on only $4.88 \times 10^{-8}$ second (0.00003125 second/640 columns of pixels). As a result, to scan discrete characters, the electron beam is on only sporadically, and for a much shorter duration that is substantially less than 0.00003125 second. The optical sensor senses this sporadic, near-instantaneous behavior as noise and rejects it. Although it has not been found to be necessary, it would be possible to add electronic filters to the receiving circuitry within watch 14 to provide further assurance that pulses of relatively short duration are ignored.

According to this second technique, it is believed that any color may be used to write the textual image so long as the image is displayed in discrete raster-scanned alphanumeric characters.

Figure 5:
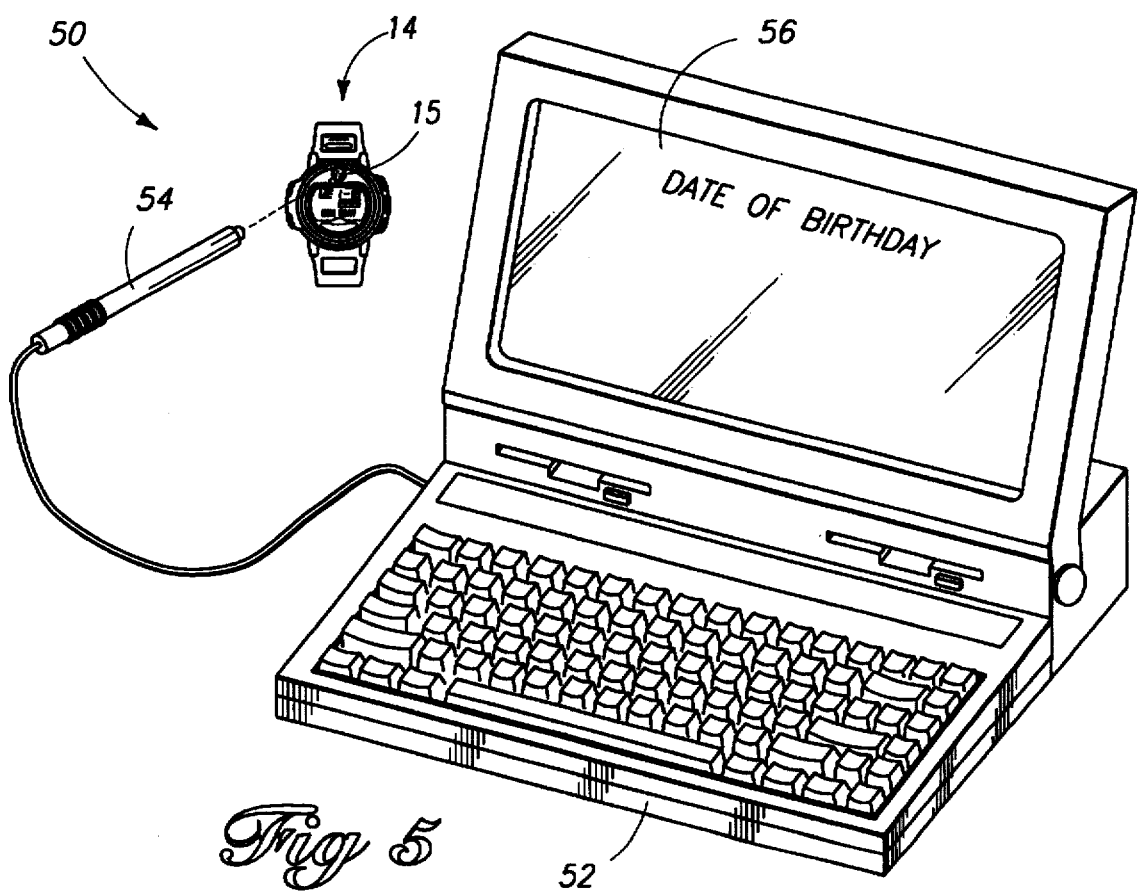
FIG. 5 is a diagrammatic illustration of a system for remotely programming an optical programmable watch according to another embodiment of this invention.

FIG. 5 shows a system 50 for remotely programming a programmable watch 14 according to another embodiment of this invention. System 50 includes watch 14, a portable computer 52 (such as a laptop or palmtop computer), and a wand 54. Portable computer 52 has a flat panel screen 56, such as a passive LCD screen which does not produce illuminated lines like a CRT monitor.

In this embodiment, the wand 54 serves as the source of the data-transmitting optical patterns. The wand is connected to the parallel or serial port of the portable computer and receives programming signals from the pattern generating software loaded in the portable computer. In response to the programming signals, pen 54 generates a series of pulsed light bursts that are used to program the watch. The pen is held close to the watch face so that optical sensor 15 can detect the series of light bursts.

The textual image explaining the data transfer to the user is displayed on the screen 56. Since the optical sensor will not detect any images depicted on the screen, the textual image can be displayed in any color or written in any manner.

Figure 6:
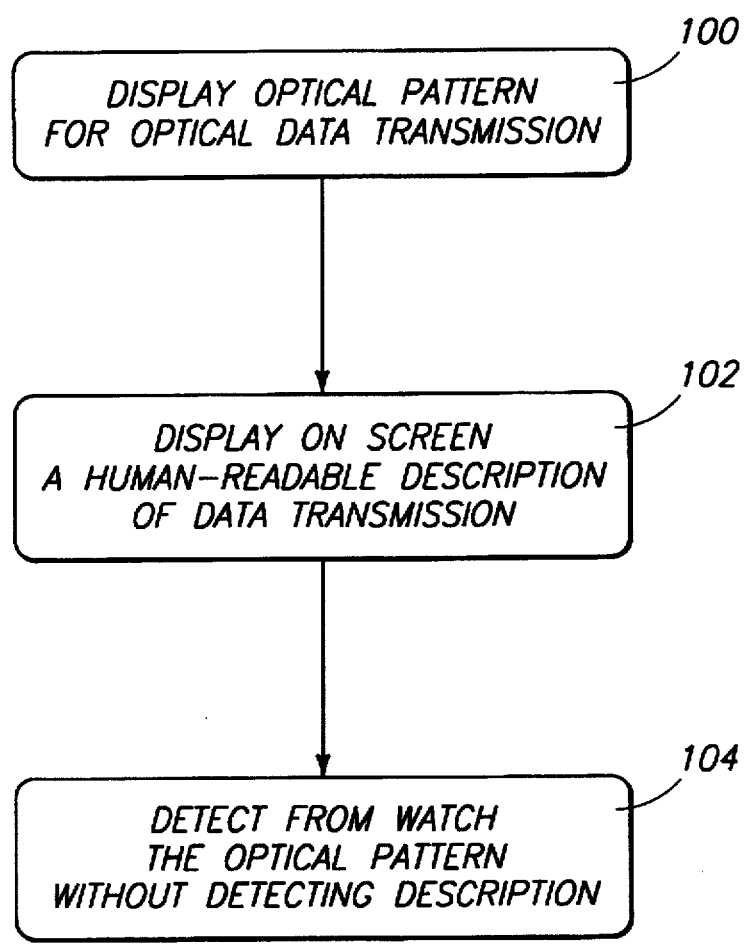
FIG. 6 is a flow diagram of a method of preferred steps for programming an optically programmable watch.

FIG. 6 shows a method for remotely programming a programmable portable information device, such as a programmable watch, according to this invention. The steps appearing in the flow diagram are presented in no special order, and preferably occur simultaneously. At step 100, an optical pattern is displayed on the CRT monitor or generated by the light wand. The optical pattern is used to optically transmit data to the watch. A human-readable image is displayed on the computer screen during the data transmission to explain the operation to the user (step 102). At step 104, the optical sensor on the watch senses the optical pattern and deciphers the data for use in programming. The human-readable image is displayed, however, in such a manner that it is not detected by the optical sensor on the watch.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for remotely programming a programmable portable information device using optical data transmission from a visual display device, the portable information device having an optical sensor, the method comprising the following steps:

displaying, on the visual display device, a sequence of changing optical patterns in a first color that is detectable by the optical sensor of the portable information device to optically transmit a serial stream of data; and displaying, on the visual display device concurrently with the sequence of optical patterns, a human-readable image in a second color different from the first color that cannot be detected by the optical sensor to explain to a user the data being optically transmitted through use of the optical patterns, wherein the optical patterns in the first color and the human-readable image in the second color are visible to a human eye.

2. A method as recited in claim 1, wherein the visual display device comprises a scanned-pixel monitor, and the step of displaying a sequence of optical patterns comprises the step of displaying sets of serially and contiguously scanned lines that extend across the scanned-pixel monitor.

3. A method as recited in claim 1, wherein the step of displaying a human-readable image comprises the step of displaying text.

4. A method for remotely programming a programmable portable information device using optical serial data transmission from a display device having a scanning light source, the portable information device having an optical sensor, the method comprising the following steps:

displaying, on the visual display devices a sequence of changing optical patterns of long scanning duration that is detectable by the optical sensor of the portable information device to optically transmit a serial stream of data; and displaying, on the display concurrently with the sequence of optical patterns, a human-readable image in discrete scanning bursts of comparatively short scanning duration that cannot be detected by the optical sensor to explain to a user the data being optically transmitted through use of the optical patterns, wherein the optical patterns and the human-readable image are visible to a human eye.

5. A method as recited in claim 4, wherein the visual display device comprises a scanned-pixel monitor, and the step of displaying a sequence of optical patterns comprises displaying sets of serially and contiguously scanned lines that extend across the scanned-pixel monitor.

6. A method as recited in claim 4, further comprising the step of displaying the discrete bursts in a form of alphanumeric characters that are intelligible to humans.

7. A system comprising:

a portable information device having an optical sensor;

a display device to display a sequence of changing optical patterns in a first color that is detectable by the optical sensor of the portable information device to transmit a serial stream of data to the portable information device; and the display device also displaying a human-readable image in a second color different from the first color that cannot be detected by the optical sensor to explain to a user the data being optically transmitted through use of the optical patterns, wherein the optical patterns in the first color and the human-readable image in the second color are concurrently displayed and are visible to a human eye.

8. A system comprising:

a portable information device having an optical sensor;

a display device to display a sequence of changing optical patterns of long scanning duration that is detectable by the optical sensor of the portable information device to optically transmit a serial stream of data; and the display device also displaying a human-readable image in discrete scanning bursts of comparatively short scanning duration that cannot be detected by the optical sensor to explain to a user the data being optically transmitted through use of the optical patterns, wherein the optical patters and the human-readable image are concurrently displayed and are visible to a human eye.

9. A method as recited in claim 8, wherein the visual display device comprises a scanned-pixel monitor that displays sets of serially and contiguously scanned lines that extend across the scanned-pixel monitor.

10. A system as recited in claim 8, wherein the discrete bursts are displayed in a form of alphanumeric characters intelligible to humans.

11. A computer program embodied on a computer-readable medium to be used in a computer for programming a portable information device that is equipped with an optical sensors comprising:

code to direct a visual display device to display a sequence of changing optical patterns in a first color that is detectable by the optical sensor of the portable information device to optically transmit a serial stream of data to the portable information device; and code to direct the visual display device to display a human-readable image in a second color different from the first color that cannot be detected by the optical sensor to explain to a user the data being optically transmitted through use of the optical patterns, wherein the optical patterns in the first color and the human-readable image in the second color are concurrently displayed and are visible to a human eye.

12. A computer program embodied on a computer-readable medium to be used in a computer for programming a portable information device that is equipped with an optical sensor, comprising:

code to direct a visual display device to display a sequence of changing optical patterns of long scanning duration that is detectable by the optical sensor of the portable information device to optically transmit a serial stream of data to the portable information device; and code to direct the visual display device to display a human-readable image in discrete scanning bursts of comparatively short scanning duration that cannot be detected by the optical sensor to explain to a user the data being optically transmitted through use of the optical patterns, wherein the optical patterns and the human-readable image are concurrently displayed and are visible to a human eye.

* * * * *